United States Patent [19]

Castille

[11] Patent Number: 4,577,895

[45] Date of Patent: Mar. 25, 1986

[54] PIPE JOINT HAVING PRESSURE ACTIVATED SEALING MEANS

[75] Inventor: Alan J. Castille, Lafayette, La.

[73] Assignee: Hub City Iron Works, Inc., Lafayette, La.

[21] Appl. No.: 573,216

[22] Filed: Jan. 23, 1984

[51] Int. Cl.$^4$ ............................................. F16L 15/00
[52] U.S. Cl. .................................. 285/334; 285/347; 285/351; 285/355
[58] Field of Search ............... 285/347, 333, 334, 351, 285/355, 95

[56] References Cited

U.S. PATENT DOCUMENTS

| | | | |
|---|---|---|---|
| 2,525,799 | 10/1950 | Hecker | 285/347 X |
| 2,532,632 | 12/1950 | MacArthur | 285/333 X |
| 3,100,656 | 8/1963 | MacArthur | 285/333 X |
| 3,822,902 | 7/1974 | Maurer et al. | 285/333 X |
| 4,085,951 | 4/1978 | Morris | 285/347 X |

Primary Examiner—Dave W. Arola
Attorney, Agent, or Firm—Guy E. Matthews

[57] ABSTRACT

A joint for interconnecting a pair of pipes having two-step Hydril-type connection means disposed thereupon. A secondary sealing means is disposed on the pin member connection means within a thread groove which forms part of the seal housing along with pin and box member torque shoulders.

6 Claims, 4 Drawing Figures

PIPE JOINT HAVING PRESSURE ACTIVATED SEALING MEANS

BACKGROUND OF THE INVENTION

This invention relates to an improvement in well pipe joints. While the invention is useful for a variety of purposes, it is particularly adapted for use in the drilling and production of oil and gas wells and the like, and the following description is specifically directed toward that use. Of course, other uses will readily manifest themselves to those skilled in the various arts.

DESCRIPTION OF THE PRIOR ART

Hydril-type connectors have long since been disclosed in the art, e.g., U.S. Pat. No. 2,532,632. The art is also replete with hydril-type connectors having sealing means, e.g. O-rings, which are adapted to provide secondary sealing adaptations on certain Hydril-type connectors. One such disclosure appears in U.S. Pat. No. 3,100,656 which details the utilization of a tough plastic seal ring located in the area of the free terminal forward end of the pin member of the hydril-type connector. In this particular instance however, it was discovered that such a location of the seal ring made the connector highly susceptible to damage, and subject to a tendency to be locally deranged in an unpredictable manner as the joint is made up. U.S. Pat. No. 4,085,951 teaches a hydril-type connector wherein the torque shoulder is moved back to make room for a secondary sealing means which seals the interior of the pipe against the fluid pressure therein. In this particular adaptation, however, it is necessary to alter or change the hydril technology, which invariably weakens the connection. This reference also discloses the utilization of an annular ring in the formation of a compression-type seal. As the pin and box members are screwed together, the seal is compressed between what used to be the center torque shoulders.

It is therefore an object of the present invention to provide a pipe joint construction which will overcome the deficiencies inherent in prior art well pipe joints or pipe connectors.

DETAILED DESCRIPTION OF THE INVENTION

Figure 1:
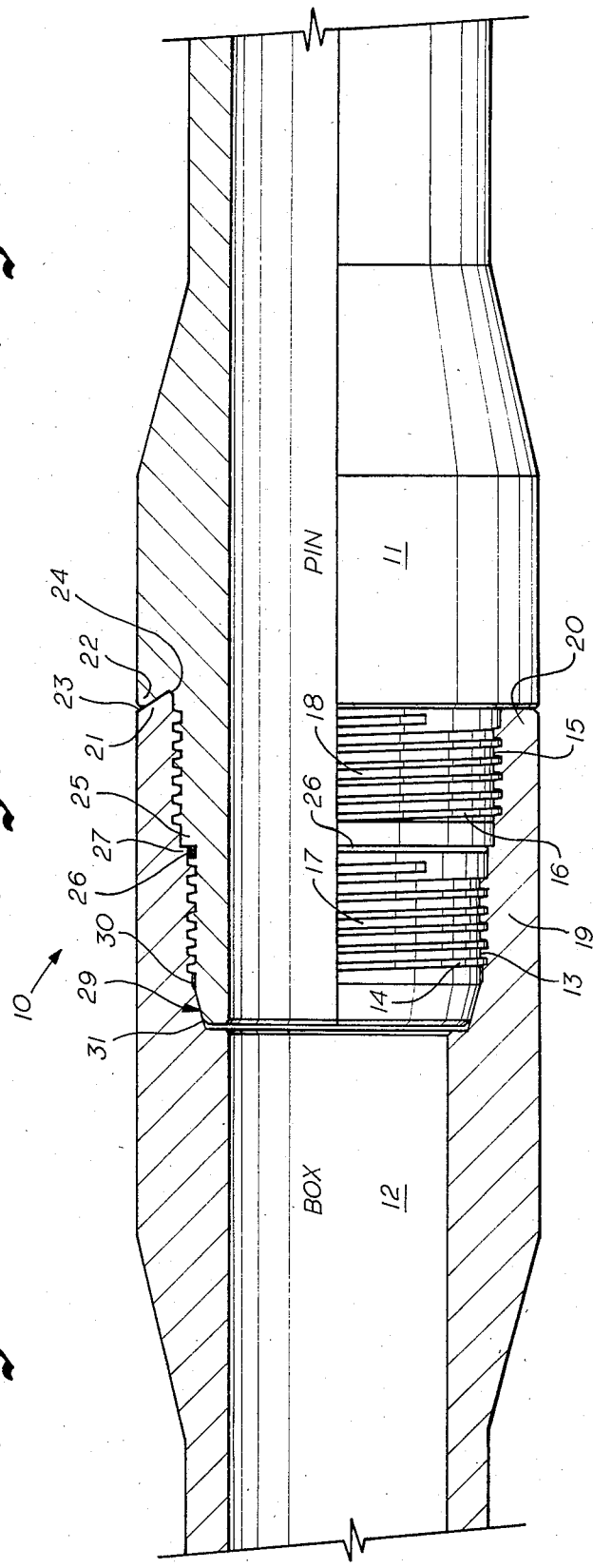
FIG. 1 is a longitudinal sectional view taken through the joint showing it in engaged position.

FIG. 1 shows a pipe connection 10 which includes a pin member 11 and a box member 12 having interengaged threads 13 and 14 in one step, and interengaged threads 15 and 16 in a second step. The engageable members are of the two-step variety, with the pin threads 14 and 16 being cut on steps 17 and 18 respectively. The threads 13 and 15 of the box member 12 are similarly cut on steps 19 and 20 respectively, with all of the threads having the same pitch and outline characteristics so as to be complementary upon engagement.

Figure 3:
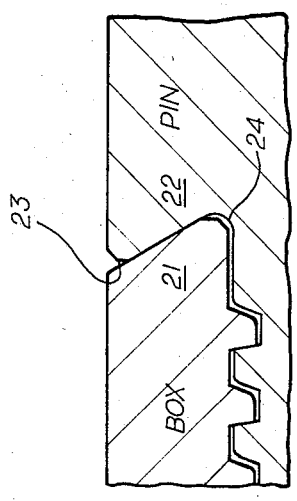
FIG. 3 is an enlarged view of the intersection formed at the forward terminal end of the box member and the rear terminal end of the pin member of FIG. 1.

As detailed in FIG. 3, a 30° tapered stop shoulder 22 is provided at the rear terminal end of the pin member 11. A forward terminal end box member stop shoulder 21 is complementary to the opposing rear terminal end pin member stop shoulder 22, each of these members having rather shallow 45° angle bevels disposed in the area of the intersection of these members. The innermost portion 23 of the 45° angle bevel of the pin member stop shoulder 22 details a 90° angulation so that interference from surface damage will be reduced as the members 21 and 22 are being screwed about the longitudinal axis into sealing engagement. The innermost portion 24 of the forward terminal end of the box member 12 also details a complementary 90°/45° angular configuration at this intersection so as to reduce surface damage to the pin member 11 as engagement about the longitudinal axis occurs. This angular configuration also provides extra clearance for any possible debris encountered during the engagement procedure.

Figure 4:
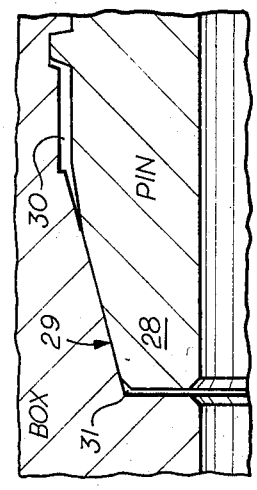
FIG. 4 is an enlarged view of the metal-to-metal seating surface conformed by the forward terminal end of the pin member and the rear terminal end of the box member.

When fully engaged, as in FIG. 4, the forward terminal end of the pin member 11 and the rear terminal end of the box member 12 detail mating stop shoulders 28 and 29 having complementary 14° angular configurations. These shoulders provide metal-to-metal seating surfaces which act to seal the interior to the pipes from the exterior of the pipes, thereby preventing the outward escape of high fluid pressure from the joint. The forward terminal end of the pin member 11 also provides an additional 9.5° angular taper 30 between the pin member stop shoulder 28 and the forwardmost external thread means of the pin member. This angular taper 30 provides extra clearance for debris, and aids in the reduction of galling during the engagement procedure. The forward terminal end of the pin member 11 further defines a 45° annular taper 31 which aids in the reduction of surface damage to the 14° seating surfaces during make-up.

Figure 2:
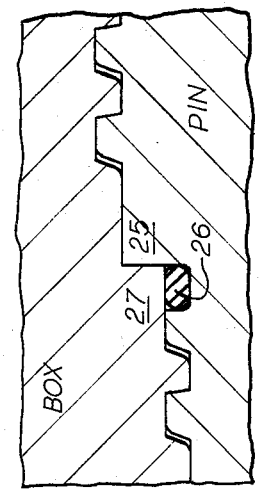
FIG. 2 is an enlarged view of the secondary sealing means, or annular sealing ring of the present invention.

While the primary seal for the joint of the present invention is provided by the metal-to-metal seating surfaces of the mating stop shoulders 28 and 29, it is possible that these shoulders may become damaged through some unforeseeable occurrence. Since it is a primary intent of the invention to provide containment for full well pressure within the pipes, a secondary sealing means is therein provided to seal the interior of the pipes against the escape of fluid pressure therefrom. Such secondary sealing means is furnished by an annularly continuous ring 26, or O-ring. As is indicated in FIGS. 1 and 2, the O-ring 26 is disposed in an O-ring groove defined in step 17 of the pin member 11 adjacent a pin member torque shoulder 25 formed in the area where steps 17 and 18 abut. In operation, once the O-ring 26 has been appropriately positioned on the pin member 11, the external thread means of the pin member 11 are interengaged with the internal thread means of the box member 12 by screwing the pin member forwardly about the longitudinal axis of the pipes into the box member until firmly engaged. When engaged, the steps 19 and 20 of the box member 12 define a box member torque shoulder 27 which complements pin member torque shoulder 25, thereby defining a closed cavity for housing the secondary sealing means, or O-ring 26. Upon the occurrence of pressure escape through the metal-to-metal seating surfaces of the mating stop shoulders 28 and 29, the O-ring 26 will be compressed against the pin torque shoulder 25 by means of the pressure differential generated by the pressure escape to provide a secondary sealing means to prevent leakage of fluid pressure from the interior of the pipes to the exterior of the pipes.

The annularly continuous ring, or O-ring 26, is sized to fit completely and compatibly within the thread groove of the pin member 11 such that the O-ring 26 is not deformed as the pin member penetrates the box member 12, or is not compressed as the box member torque shoulder 27 aligns with the pin member torque shoulder 25 to form the seal housing. In the preferred embodiment of the present invention, the O-ring 26 is made of a high temperature elastomeric material, such a Vitron, or the like.

The seal ring 26 is preferably round in cross-section as illustrated in FIG. 1, or may be slightly oval in cross-section as illustrated in FIG. 2. Seal ring 26 is preferably of size such that the outside diameter of the ring fits in movable touching contact with the internal diameter of the counterbore of the box member 12 at torque shoulder 27 and fits in movable touching contact with the outside diameter of the bottom of the seal groove adjacent to torque shoulder 25. These fits of sealing ring 26 as described are such that the seal ring has no substantial deformation during assembly of pin member 11 and box member 12 and has substantially no risk of becoming pinched or cut when the counterbore passes across the groove while the coupling is being assembled to where torque shoulder 25 is brought into abutment with torque shoulder 27.

In summary, the invention resides as an improvement combination incorporated in a stepped-thread pipe connector 10 of the type illustrated and described herein, including, a tapered metal seal seat 28 formed at the end of a pin member fitting 11 in sealed relation within a complementary metal seal seat 29 formed within a box member 12, co-acting inner step-threads 13 and 14 formed by the box member and the pin member axially adjacent to the metal seal seats, and co-acting inner seat-threads 15 and 16 of larger diameter than the inner step-threads, formed by the box member and the pin member, axially adjacent to the inner step-threads. The improvement combination includes a radial box torque shoulder 27 formed in the box member 12 and having an outside diameter the same as the inside diameter of the outer female step threads 15 and of internal diameter the same as the outside diameter of the male inner step threads 14; and a radial pin torque shoulder 25 formed on the pin member 11 and having an outside diameter the same as the inside diameter of the female outer step female threads 15 and of inside diameter the same as the outside diameter of the male inner step threads 14. A seal ring groove 26 is defined into the outside diameter of the pin member 11 as a radial continuation of the pin torque shoulder 25 between the male upper step threads 16 and the male lower step threads 14. A counterbore is defined within the box member 12 to extend axially from the internal diameter or the box torque shoulder 27 for a distance sufficient to enclose the seal ring 26 groove as a cavity when the pin torque shoulder 25 and the box torque shoulder 27 are brought into abutment. The seal ring means 26 is disposed and confined within the cavity to fit in movable touching contact with the bottom internal diameter of said seal ring groove and in movable touching contact with said counterbore with no substantial deformation of the ring 26. The said seal ring 26 as confined is being adapted to be readily moved into sealing relation across the juncture of the box torque shoulder 27 and the pin torque shoulder 25. The seal ring 26 is adapted to risk substantially no pinches or cuts as the counterbore is moved across of box member 12 and the seal ring 26 groove to form the seal ring cavity.

What is claimed is:

1. In a stepped-thread pipe connector, including a pin and box member with a tapered metal seal seat formed at the end of a pin member fitting in sealed relation with a complementary metal seal seat formed within a box member, co-acting inner step threads formed by said box member and said pin member axially adjacent to said metal seal seats, and co-acting outer step threads of larger diameter than said inner step threads formed by said box member and said pin member axially adjacent to said inner step threads, the improvement comprising in combination:
   (a) a radial box torque shoulder formed in said box member and having an outside diameter the same as the inside diameter of the outer female step threads and of internal diameter the same as the outside diameter of the male inner step threads;
   (b) a radial pin torque shoulder formed on said pin member and having an outside diameter the same as the inside diameter of the female outer step female threads and of inside diameter the same as the outside diameter of the male inner step threads;
   (c) a seal ring groove defined into the outside diameter of said pin member as a radial continuation of said pin torque shoulder between said male upper step threads and said male lower step threads;
   (d) a counterbore defined within said box member to extend axially from the internal diameter of said said box torque shoulder for a distance sufficient to enclose said seal ring groove is a cavity defined by said counterbore, torque shoulders and groove when said pin torque shoulder and said box torque shoulder are brought into abutment;
   (e) said seal ring as confined being adapted to be readily moved into sealing relation across the juncture of said box torque shoulder and said pin torque shoulder; in response to fluid pressure application and
   (f) said seal ring being substantially free of pinches or cuts as said counterbore is moved across said groove to form said cavity.

2. The improvement of claim 1 wherein said seal ring is comprised of a tough, high temperature elastomer.

3. The improvement of claim 1 wherein said seal ring is provided as a secondary sealing means which may be repeatedly assembled and disassembled without need for replacement of a damaged seal ring.

4. The improvement of claim 1 wherein such seal ring means is disposed and confined within said cavity to fit in movable touching contact with the bottom internal diameter of said seal ring groove and in movable touching contact with said counterbore with no substantial deformation of said ring.

5. In a stepped-thread pipe connector including a pin and box member with a tapered metal seal seat formed at the end of a pin member fitting in sealed relation with a complementary metal seal seat formed within a box member, co-acting inner step threads formed by said box member and said pin member axially adjacent to said metal seal seats, and co-acting outer step threads of larger diameter than said inner step threads formed by said box member and said pin member axially adjacent to said inner step threads, the improvement comprising in combination:

(a) a radial box torque shoulder formed in said box member and having an outside diameter the same as the inside diameter of the outer female step threads and of internal diameter the same as the outside diameter of the male inner step threads;

(b) a radial pin torque shoulder formed on said pin member and having an outside diameter the same as the inside diameter of the female outer step female threads and of inside diameter the same as the outside diameter of the male inner step threads;

(c) a seal ring groove defined into the outside diameter of said pin member as a radial continuation of said pin torque shoulder between said male upper step threads and said male lower step threads;

(d) a counterbore defined within said box member to extend axially from the internal diameter of said said box torque shoulder for a distance sufficient to enclose said seal ring groove in a cavity defined by said counterbore, torque shoulders and groove when said pin torque shoulder and said box torque shoulder are brought into abutment;

(e) seal ring means disposed and confined within said cavity to fit in movable touching contact with the bottom internal diameter of said seal ring groove and in movable touching contact with said counterbore with only moderate torque needed to repeatedly assemble said pipe connector; and (f) said seal ring as confined being adapted to be readily moved into sealing relation across the juncture of said box torque shoulder and said pin torque shoulder responsive to fluid pressure application from the direction of said metal seal seats.

6. The improvement of claim 5 wherein said seal ring is sized as a secondary sealing means which may be repeatedly assembled and disassembled without need for replacement of a damaged seal ring.

* * * * *